Figure 1:
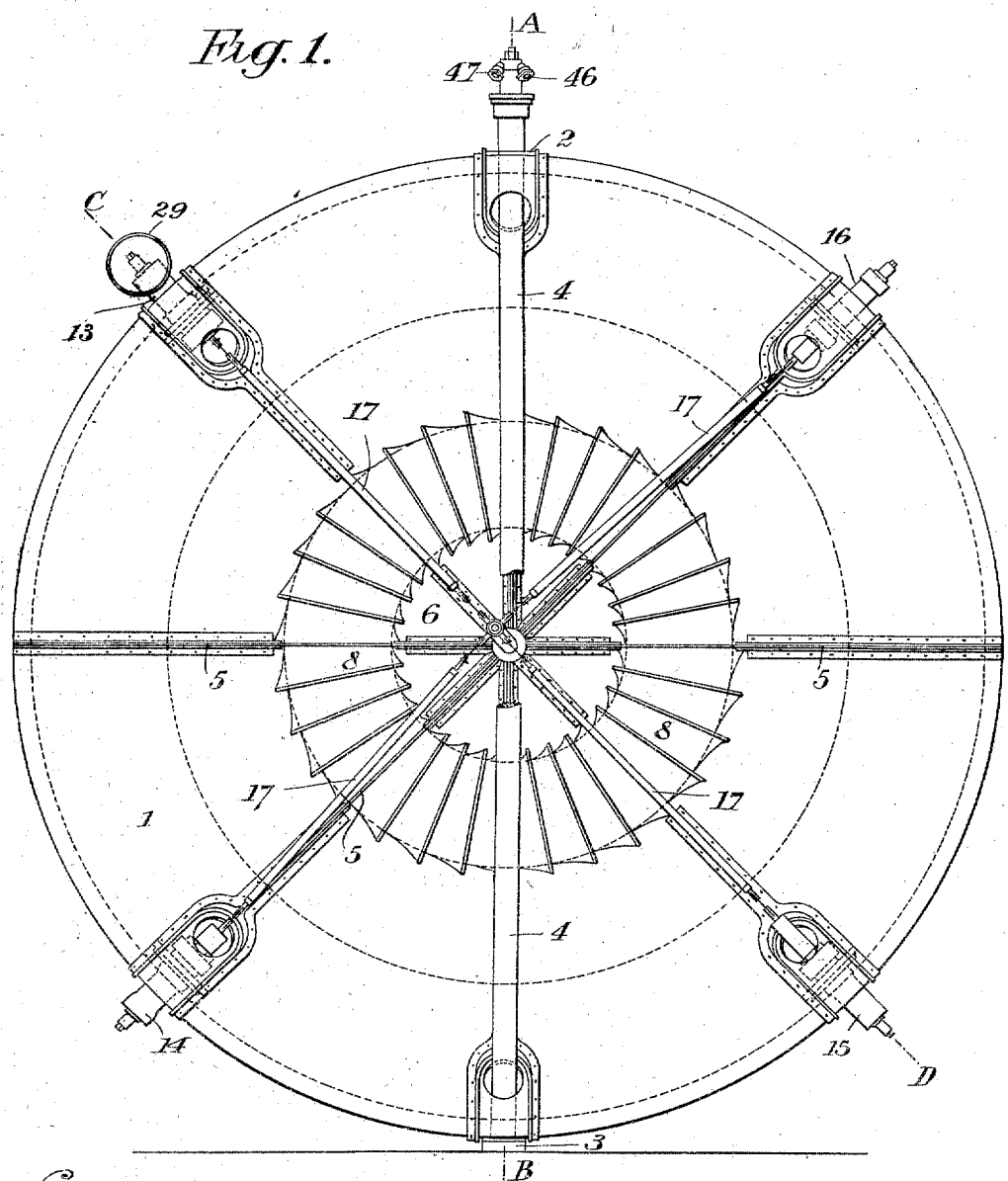

S. PICHAULT.
APPARATUS FOR STORING AND DISTRIBUTING WIND POWER.
APPLICATION FILED FEB. 24, 1906.

984,599.

Patented Feb. 21, 1911.

Inventor
Stephane Pichault

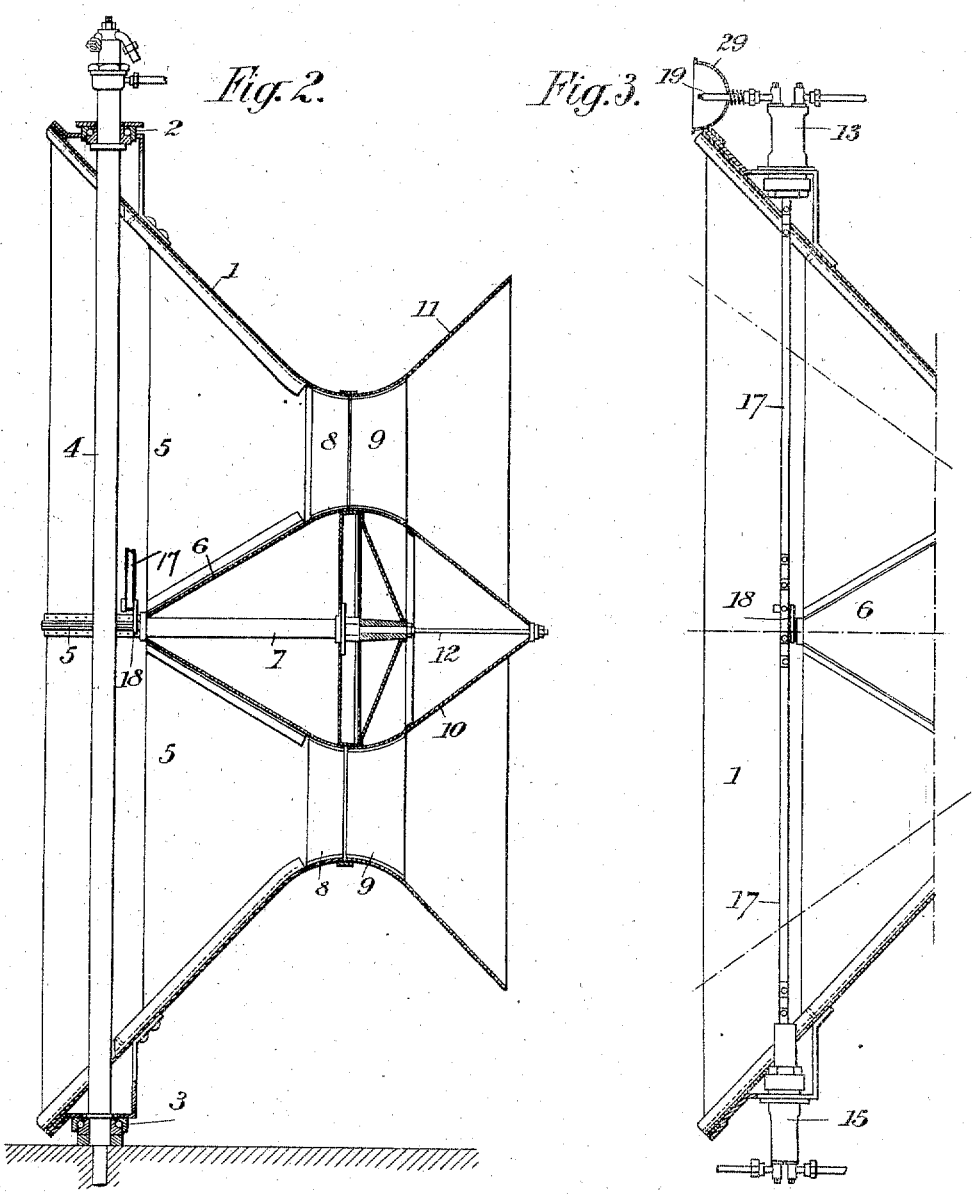

S. PICHAULT.
APPARATUS FOR STORING AND DISTRIBUTING WIND POWER.
APPLICATION FILED FEB. 24, 1906.
984,599.
Patented Feb. 21, 1911.
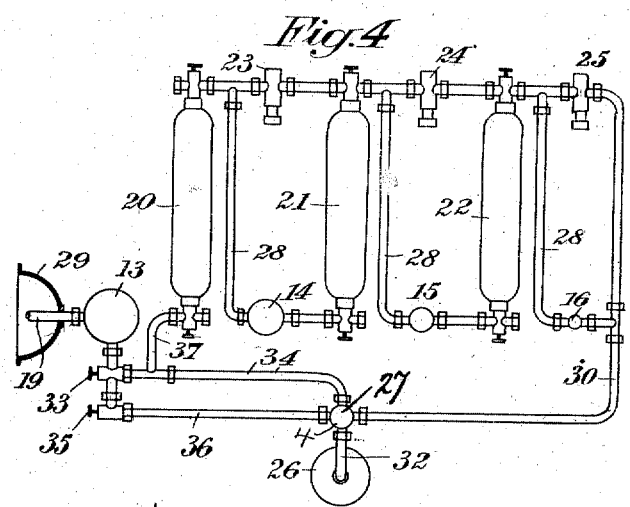
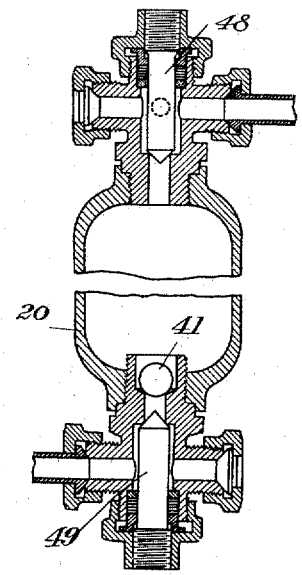
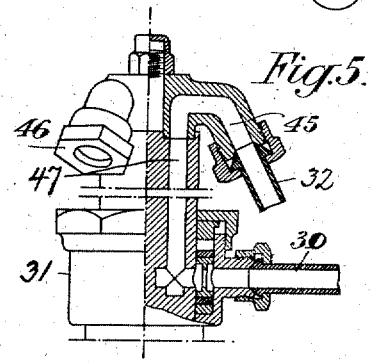
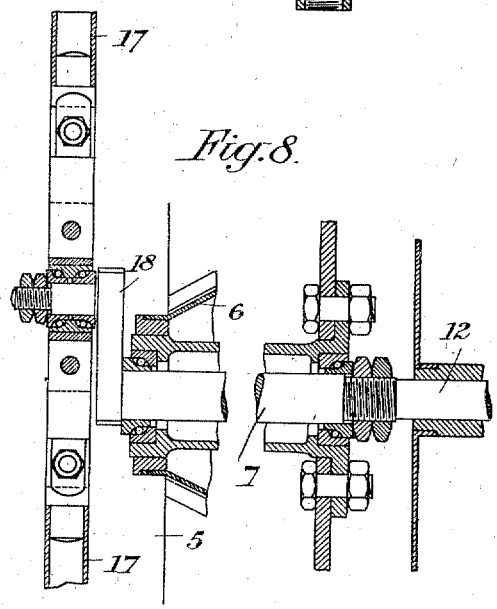
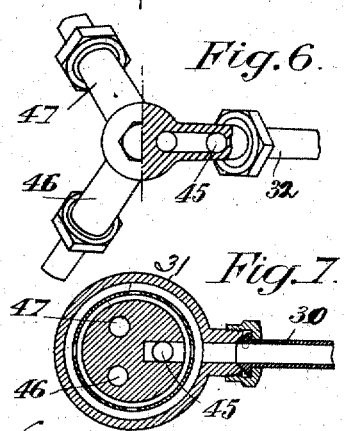

S. PICHAULT.
APPARATUS FOR STORING AND DISTRIBUTING WIND POWER.
APPLICATION FILED FEB. 24, 1906.
984,599.
Patented Feb. 21, 1911.
5 SHEETS—SHEET 4.
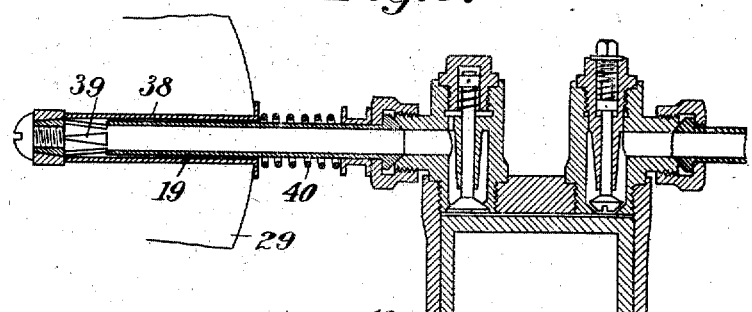
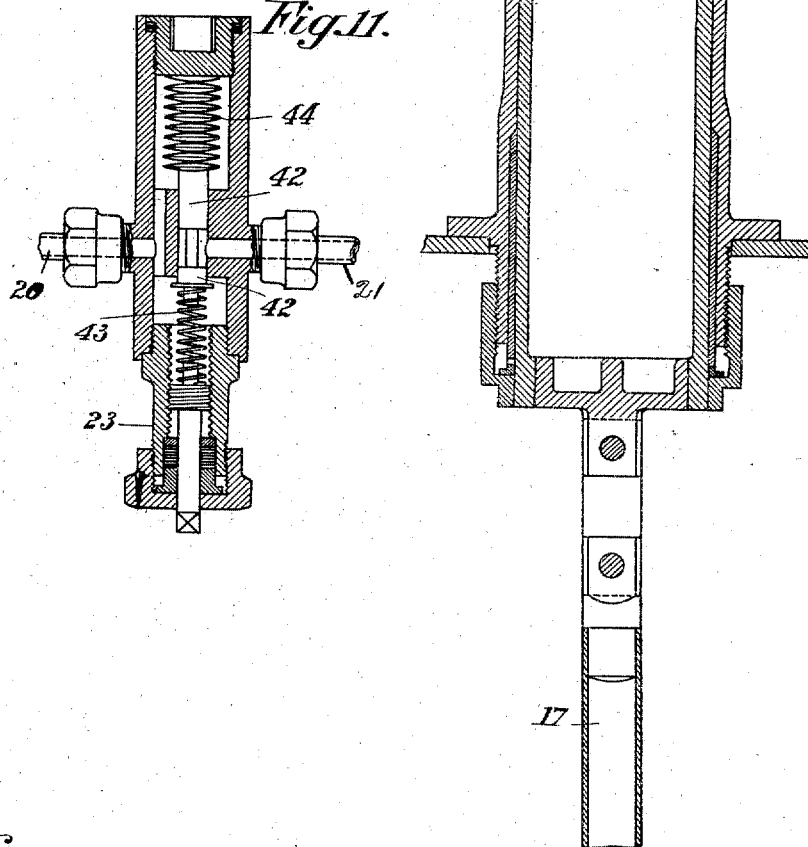

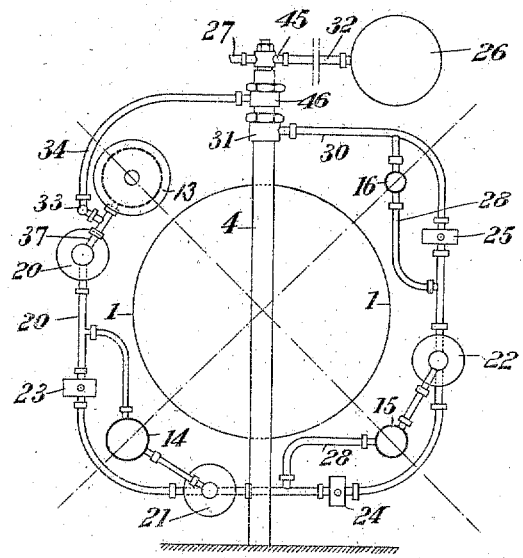
Fig. 11ᵃ

UNITED STATES PATENT OFFICE.

STEPHANE PICHAULT, OF VALENCIENNES, FRANCE.

APPARATUS FOR STORING AND DISTRIBUTING WIND-POWER.

984,599.    Specification of Letters Patent.    Patented Feb. 21, 1911.

Application filed February 24, 1906. Serial No. 303,008.

*To all whom it may concern:*

Be it known that I, STEPHANE PICHAULT, a citizen of the French Republic, and resident of Valenciennes, in the North Department, France, have invented certain new and useful Improvements in Apparatus for Storing and Distributing Wind-Power, of which the following is a specification.

My invention relates to wind wheels and has for its object, among others, to provide a wind wheel adapted to store up compressed air in suitable reservoir or reservoirs, and the invention consists in the novel construction, arrangement and combination of parts as hereinafter fully described, illustrated in the drawings and pointed out in the appended claims.

The complete apparatus and the details of its various constituent parts are shown in the annexed drawing in which:

Figure 1 is a front view of the complete apparatus. Fig. 2 is a vertical section on line A—B of Fig. 1. Fig. 3 is another section on line C—D of Fig. 1, turned into a vertical position. Fig. 4 is a diagram showing the pipes which connect up the various parts of the apparatus. Figs. 5, 6 and 7 are vertical and horizontal sections of the upper end of the pivot of the apparatus, given by way of example. Fig. 8 is a vertical section showing how the driving shaft carrying the turbine of the apparatus is mounted. Fig. 9 is a vertical section of one of the air compressing pumps of the apparatus, the said section showing at the same time the air inlet with which one of the pumps is provided. Fig. 10 is a vertical section of one of the reservoirs interposed between the compressing pumps, and Fig. 11 is a vertical section of one of the pressure regulators, which are likewise interposed between each compressing pump and the reservoir wherein it delivers the air. Fig. 11ª is an elevation showing the pipe connections between the pumps, vertical shaft and reservoirs.

The apparatus thus shown comprises (Figs. 1, 2 and 3) a large funnel 1 of conical shape with an inverse extension at the rear, and mounted on ball bearings 2 and 3 on a vertical axis 4 which is securely fixed at the upper part of some existing building or of a frame-work provided for the purpose. Ribs or partitions 5, connect the funnel 1 to a center cone 6 oppositely disposed to that which forms the funnel 1, and serve as supports (Fig. 8) for a horizontal shaft 7. Between the cone 6 and the funnel 1, a distributing crown having vanes 8 similar to those of motor turbines is mounted and facing this crown there is another crown 9 which also has vanes but inversely curved and constituting, as in turbines, the moving or motive part of the apparatus. The movable crown 9 is fixed to a central cone 10 oppositely arranged to 6, and has fixed to it an outer cone 11 oppositely arranged to the funnel 1, the parts 9, 10 and 11 being fixed on an extension 12 of the horizontal shaft 7 and rotating with this shaft. On the periphery of the funnel 1, pumps 13, 14, 15, 16, are fixedly mounted, and the pistons of said pumps are connected by rods 17 to a crank 18 fixed on the shaft 7. These pumps are connected so as to deliver the air by progressive compressions up to the pressure corresponding to the highest speed of the wind into a special reservoir having a suitable capacity.

The members receiving the action of the wind (with the pump actuated by it and all the accessories) are adapted to rotate freely around the vertical shaft 4 on the ball bearings 2 and 3. The shaft 4 is provided with longitudinal passages 46, 47, which connect with the pumps and the storing reservoirs as seen in Figs. 4, 5, 6 and 7, so that the pump 13 draws in the air and forces it into pump 14 which in turn forces it into pump 15 and the latter forces it into pump 16. Pump 16 forces the air through pipe 30 into passage 47 in shaft 4 and thence through passages 32 and 45 into reservoir 26. The motor shaft 7 can be supported by the central cone 6 by means of ball bearings of the kind of those shown in Fig. 8 which shows likewise the special arrangement of the crank and the cross whereto the connecting rods 17 are coupled.

The funnel 1 owing to it being mounted near its front edge, on the vertical shaft 4, faces automatically the direction of the wind which enters it violently and causes the turbine 9 to rotate. The turbine in turn, by the motor shaft 7, actuates the pumps 13, 14, 15, 16, which by means of suitable passages arranged in the shaft 4 deliver the air at more or less high pressure into any suitably arranged reservoirs 26, 27, etc.

It will be seen that the funnel 1, the entrance section of which must be very large compared with that of the passage of the turbine, directs the wind toward the latter which forms a kind of dam in the current. There results therefrom an increase of pressure and of speed at the entrance of the turbine i. e. an increase of the sum of energy which may be obtained by a given receiver. It will further be noticed that the inverse cone 11 arranged at the back and on the outside of the turbine, provides two advantages: it gradually increases the section of passage for the air escaping from the turbine which diminishes also gradually the speed of this air and it forces the annular air current passing around the whole exterior circumference of this cone to take a divergent course with reference to the horizontal axis which causes the lowering of the central pressure in the escaping cone of the turbine, thus still more increasing the utilizable work. It will furthermore be seen that the arrangement of the whole around the vertical shaft 4 renders unnecessary a special rudder.

The air compressing and storing device comprises (Fig. 4) an air intake 19, pumps, 13, 14, 15, 16 delivering the one into the other, intermediary reservoirs, 20, 21, 22 pressure reduction valves 23, 24, 25, and a reservoir 26 serving as a high tension receiver. The pumps, the intermediate reservoirs and the reduction valves are connected by pipes 28 (Fig. 4). The first pump 13 alone sucks air from the atmosphere (Figs. 3, 4, 9) through an air inlet 19 which is surrounded by a hemispherical or cylindro-conical or dish-shaped cup 29. The last pump 16 connected by the pipe 30 (Fig. 4) with a tubular member 31 (Figs. 5, 7) movable around the vertical shaft 4 is in communication through a passage arranged in the latter with the pipe 32 connected itself to the high pressure reservoir 26 which is provided with a safety valve. If the cock 33 cuts the direct communication between the pump 13 and the pipe 34 and if the cock 35 on the contrary opens the communication between the pump 13 and the pipe 36, the air delivered by the pump 13 through a passage 46 arrives in the supplemental reservoir 27. Thence it flows to the different apparatus using it under the convenient pressure. If on the contrary the supplemental reservoir 27 receives from the pump 13 less air than it furnishes, the air previously accumulated in 21 under a higher pressure, returns to 20 then to 27 through the pressure controlling device 23 conveniently adjusted. If the air accumulated in 21 is spent, it is the air of 22 which in turn passes through the pressure regulator 24 also conveniently adjusted. Finally, if the air of 22 is exhausted, the air inclosed in the large reservoir 26 passes in turn through the regulating device 25.

The air intake 19 which only exists at the pump 13 forms an admission controlling device (Fig. 9). It comprises a cylindrical equilibrated slide 38 sliding over the intake tube. This slide connected with the cup 29 is intended to uncover more or less, according to the automatic pressure of the wind, the admission openings 39 of the said admission tube. A spring 40 acts upon the slide 38 in order to close completely or nearly the openings 39 when the speed of the wind decreases below that necessary for overcoming the different passive resistances of the entire mechanism.

When the pumps 13, 14, 15 and 16 are single acting they are arranged as shown by Fig. 9. Their intake and delivering valves are conical and have a long guiding rod as well as springs. The pistons have the same stroke but their diameter is diminished in proportion as they deliver the air at a higher tension. The intermediary reservoirs 20, 21 22 are arranged in such a manner that they may be easily connected with the piping 28, shown in Fig. 4. They are provided with interrupting devices 48, 49 allowing of their being shut off, and also with a stop valve 41.

The pressure regulators (Fig. 11) have a small piston valve 42 which is compressed between an adjustable spring 43 and a series of superposed hollow, air-tight, double-convex diaphragms 44. Normally, the piston 42 is balanced for a given pressure, regulated by the spring 43. When the pressure coming from reservoir 20 is reduced, the diaphragms 44 expand in consequence of the reduced pressure existing around them, and the piston 42 is forced down and opens a passage for the air from the reservoir 21 at a higher pressure. When equilibrium is restored diaphragms 44 are again contracted, the piston 42 rises again, and the same movement is repeated as long as the reservoir at a higher pressure can supply air.

The essential features of the arrangement for compressing, storing and distributing the compressed air are indicated in the drawings in the following manner:—The vertical shaft 4 carries a number of stuffing boxes provided with pipes (Figs. 5, 6, 7) corresponding to that of the passages connecting the pumps both with the high tension reservoir and to the supplemental ones. Figs. 5, 6, 7, show, as an example, three passages 45, 46, 47. The first receives the air from the pump 16 and conveys it to the reservoir 26; the two others 46, 47 are in communication, by two boxes 31 and by the pipes 34, 36, with the pump 13 and the supplemental reservoir (not shown) but which has been designated by 27. The action of the apparatus will now be readily understood. When the supplemental reservoir is not used the wind striking the funnel 1 enters the air intake controller 29, penetrates through the openings 39 into the pump 13 which has the largest diameter and delivers the air under a certain pressure into the intermediate reservoir 20. When the apparatus is being started and the other reservoirs and the pipes are still under atmospheric pressure the air escapes so to speak freely and enters the storing receptacle 26 passing through the scarcely lifted valves of the pumps 14, 15, 16, as well as through the pressure controlling devices 23, 24, 25, which, of course are all open, but as soon as the whole pressure attains the height at which the closure of 23 takes place, the pistons of the pumps 14 begin to compress the air in an efficient manner. The same occurs, in the pumps 15, 16 when 24 and 25 are closed in turn. The storing reservoir 26 is then slowly filled until the pressure limited by the safety valve is reached.

The apparatus (which collects, stores and distributes automatically the energy of the wind) such as has been described above, forms a complete whole which may be constructed in any size.

The exact shape of the apparatus may of course be modified as well as the arrangement of its constituting members.

Having now fully described my said invention, what I claim and desire to secure by Letters Patent is:—

1. In an apparatus of the kind described the combination with a vertical shaft, of a funnel mounted on the vertical shaft and adapted to take automatically the direction of the wind, an air turbine comprising stationary directing blades and a rotary wheel composed of a series of blades adapted to receive the action of the wind, means for decreasing the speed of the wind after it has passed through the turbine, a plurality of pumps arranged on the said funnel, an air intake with which one of said pumps is connected, means for driving the said pumps simultaneously from the turbine shaft, pipe connections between the said pumps and adapted to allow of the air being progressively compressed in the pumps, intermediate reservoirs and pressure reducing controllers, a regulator for the air intake of the first pump, and a storing reservoir for the compressed air, substantially as and for the purpose described.

2. In an apparatus of the kind described the combination with a vertical shaft, of a funnel rotatably mounted on the vertical shaft, and ball bearings between the funnel and the vertical shaft, a central cone, means connecting the central cone and the funnel, a shaft supported by the cone, stationary curved blades arranged upon the central cone between the latter and the funnel, oppositely curved blades adapted to constitute a turbine wheel, and a rear central cone carrying the said last-mentioned curved blades and secured to the said last-mentioned shaft, substantially as and for the purpose set forth.

3. In an apparatus of the kind described the combination with a funnel, of a vertical shaft adapted to rotatably support the funnel near its front edge, a central rotary cone and a diverging funnel adapted to form with the central rotary cone an annular diverging air escape passage, substantially as and for the purpose described.

4. In an apparatus of the kind described the combination with a vertical shaft rotatably supporting a funnel near its front edge, of an air turbine inside the funnel, a shaft upon which the turbine is mounted, pumps radially arranged on the said funnel, pipe connections between the said pumps, the latter being adapted to deliver compressed air one into the other for progressive compression, said pumps comprising pistons and piston rods, a crank on the turbine shaft, nearly radial connecting rods pivotally connected to the piston rods, and a common central pin arranged on the crank of the turbine shaft, and to which central pin the connecting rods are pivotally connected substantially as and for the purpose described.

In testimony whereof, I have hereunto set my hand in presence of two witnesses.

STEPHANE PICHAULT.

Witnesses:
 EDOUARD VANDENBUNDER,
 EDMOND D'HOUT.